United States Patent
Duranton (10) Patent No.: US 6,542,989 B2
(45) Date of Patent: *Apr. 1, 2003

(54) SINGLE INSTRUCTION HAVING OP CODE AND STACK CONTROL FIELD

(75) Inventor: Marc Duranton, Boissy Saint Leger (FR)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/493,960

(22) Filed: Jan. 28, 2000

(65) Prior Publication Data

US 2003/0033503 A1 Feb. 13, 2003

Related U.S. Application Data

(63) Continuation-in-part of application No. 09/333,633, filed on Jun. 15, 1999.

(51) Int. Cl.[7] .................................................. G06F 15/80
(52) U.S. Cl. ......................... 712/225; 712/24; 712/202; 345/504; 345/522
(58) Field of Search ................................. 345/504, 522; 712/24, 202, 225

(56) References Cited

U.S. PATENT DOCUMENTS

| | | | | |
|---|---|---|---|---|
| 5,043,870 A | * | 8/1991 | Ditzel et al. | 711/132 |
| 5,522,051 A | | 5/1996 | Sharangpani | |
| 5,963,744 A | * | 10/1999 | Slavenberg et al. | 712/9 |
| 6,134,573 A | * | 10/2000 | Henry et al. | 708/510 |

FOREIGN PATENT DOCUMENTS

| | | | |
|---|---|---|---|
| WO | WO 94/15280 | * | 7/1994 |
| WO | WO9530954 | | 11/1995 |
| WO | 9821655 A1 | | 5/1998 |

OTHER PUBLICATIONS

Nakamura et al., "Real–Time Multimedia Data Processing Using VLIW Hardware Stack Processor", *Proceedings of the Joint*, Apr. 1–3, 1997.*
*Workshop on Parallel and Distributed Real–Time Systems, 1997*, IEEE, pp. 296–301.*

* cited by examiner

*Primary Examiner*—William M. Treat (57) ABSTRACT

A processor comprises an arithmetic logic unit (ALU) that co-operates with a stack arrangement (STCK). The processor is arranged to execute instructions (INSTR) which include a stack control field (SCF) and an opcode field (OPF) for controlling the stack arrangement (STCK) and the arithmetic logic unit (ALU), respectively.

4 Claims, 6 Drawing Sheets

SINGLE INSTRUCTION HAVING OP CODE AND STACK CONTROL FIELD

This application is a continuation-in-part of U.S. patent Ser. No. 09/333,633 filed Jun. 15, 1999.

FIELD OF THE INVENTION

The invention relates to data processing by means of an arithmetic logic unit that co-operates with a stack arrangement. The invention may be applied in, for example, a multimedia product comprising a controller, in the form of a processor, for providing control data to various functional units.

BACKGROUND OF THE INVENTION

An arithmetic logic unit (ALU) typically carries out an operation on two input data, also called operands, so as to obtain an output data. The operation which the ALU carries out is generally defined by an instruction, also called micro code, in the form of a string of bits. The instruction may cause the ALU to carry out an arithmetic operation, for example, an addition: Z=X+Y; X and Y representing the input data and Z the output data. The instruction may also cause the ALU to carry out a logical operation, for example, an AND, OR, NAND or NOR function.

The ALU may co-operate with a stack. A stack is an assembly of storage elements, each storage element capable of containing data. Input data which are soon to be processed by the ALU are temporarily stored in the stack. An output data from the ALU may be temporarily stored in the stack too. A stack pointer generally indicates the storage element which constitutes the top-of-stack. A data which is placed on the stack is generally written into the top-of-stack and a data which is removed from the stack is generally read from the top-of-stack too. The writing and reading of data into and from the stack will be referred to as pushing and popping hereinafter. Generally, input data for the ALU are obtained by popping data from the stack and output data are stored by pushing data onto the stack. A processor which operates in this manner is referred to as a stack-based processor in the International Application published under number WO95/30954.

SUMMARY OF THE INVENTION

It is an object of the invention to allow a reduction of cost.

The invention takes the following aspects into consideration. Basically, in a stack-based processor, two types of operations are carried out. First of all, the ALU carries out arithmetic and logic operations. Secondly, the stack is manipulated so as to apply desired input data to the ALU.

It is possible to define a specific instruction for each different arithmetic and logic operation and for each different stack manipulation. In that case, the stack-based processor can be programmed to process data, for example, by means of the following sequence of instructions. First of all, a stack-manipulation instruction which causes the stack to apply desired data to the ALU, for example, a pop instruction. Secondly, an instruction which causes the ALU to carry out an arithmetic or logic operation, for example, an addition. Thirdly, a stack-manipulation instruction which causes the result of the arithmetic or logic operation to be stored into the stack, for example, a push instruction.

The number of different arithmetic logic operations may be appreciable greater than the number of different stack manipulations, or vice versa. This implies that an instruction which defines a stack manipulation can be coded with fewer bits than an instruction which defines an arithmetic or logic operation, or vice versa. That is, an instruction that defines a stack manipulation can be shorter than an instruction that defines an arithmetic logic operation, or vice versa. Coding different types of operation with instructions of variable length has the advantage that a relatively small memory will be sufficient for storing a set of instructions, i.e. a program.

However, it will generally require relatively expensive hardware in order to make a processor suitable for carrying out instructions of variable length. These costs will generally outweigh the cost advantage of a relatively small memory for storing instructions. It will thus be generally more cost-efficient if all instructions have a fixed length. Nevertheless, in that case, the memory for storing these instructions will be used inefficiently. For example, let it be assumed that there are 16 different arithmetic logic operations and 4 different stack manipulations. This implies that an instruction that defines a stack manipulation could be coded with two bits less than an instruction that defines an arithmetic or logic operation. In effect, two memory bits are wasted per stack-manipulation instruction.

According to the invention, a processor is arranged to execute instructions which include a stack control field and an opcode field for controlling the stack arrangement and the arithmetic logic unit, respectively.

Accordingly, it is possible to define, in a single instruction, an arithmetic or logic operation as well as a stack manipulation. Consequently, such instructions can have a fixed length while, for substantially each instruction, it holds that all the bits that form the instruction influence in one way or the other an operation that is carried out in the processor. Consequently, a set of such instructions will comprise very few bits, or even none at all, that do not influence data-processor operations. Consequently, it will require a smaller memory to store a set of such instructions compared with a set of instructions of fixed length in which there are separate instructions for arithmetic and logic operations, on the one hand, and stack manipulations, on the other hand. Consequently, the inventions allows a reduction of cost.

These and other aspects of the invention are apparent from and will be elucidated in the description hereinafter with reference to drawings.

DETAILED DESCRIPTION OF THE INVENTION AND EMBODIMENTS THEREOF

The following remarks relate to reference signs. Like entities are designated by like letter references in all the Figures. Several similar entities may appear in a single Figure. In that case, a digit or a suffix is added to the letter reference in order to distinguish like entities. The digit or the suffix may be omitted for convenience or it may be replaced by an asterisk in the case where its value is not important (do not care value). This applies to the description as well as the claims.

Figure 1:
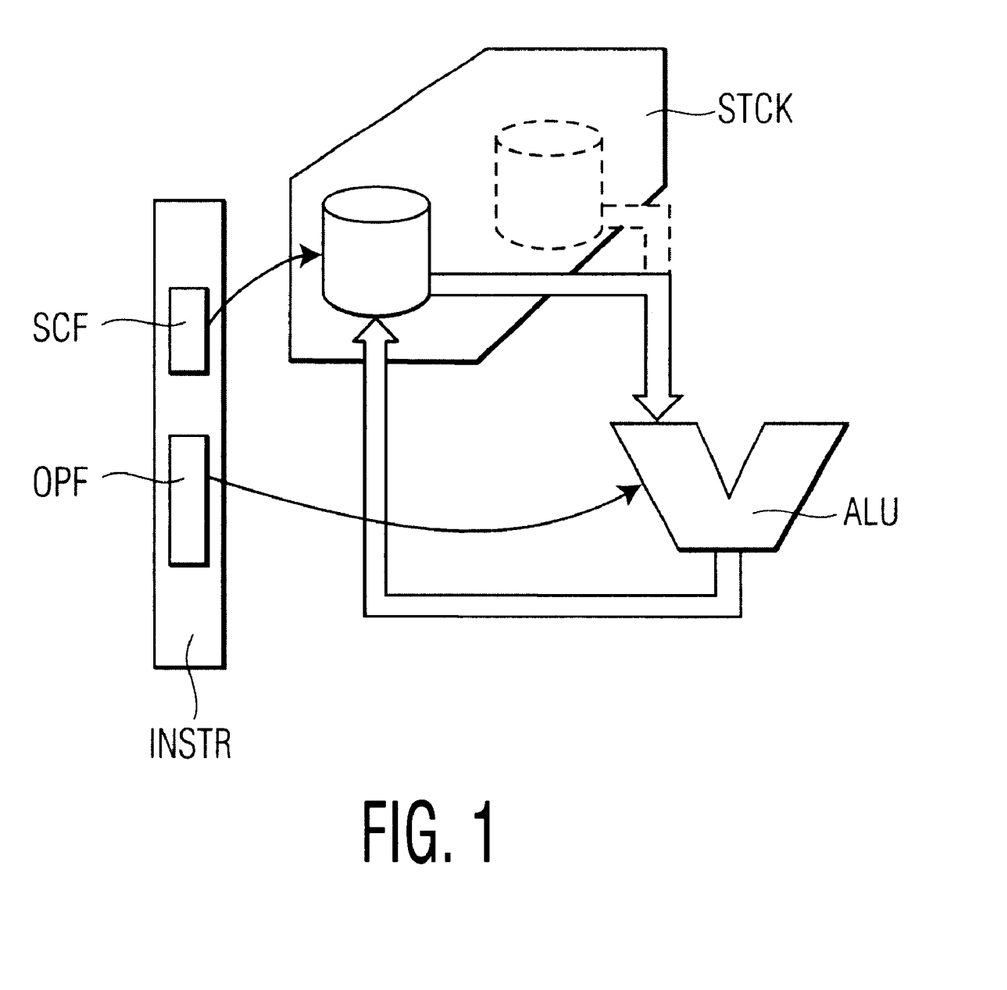
FIG. 1 is a conceptual diagram illustrating basic features of the invention as claimed in claim 1.

FIG. 1 illustrates basic features of the invention. A processor comprises an arithmetic logic unit ALU that co-operates with a stack arrangement STCK. The processor is arranged to execute instructions INSTR which include a stack control field SCF and an opcode field OPF for controlling the stack arrangement STCK and the arithmetic logic unit ALU, respectively.

The features illustrates in FIG. 1 may be applied, for example, in a control processor which forms part of a multi-processor arrangement such as, for example, a multimedia device. The control processor executes a set of instructions which causes the control processor to apply control data to various processors comprised in the multi-processor arrangement. The set of instructions may wholly or partially be contained in an internal program memory.

Figure 2:
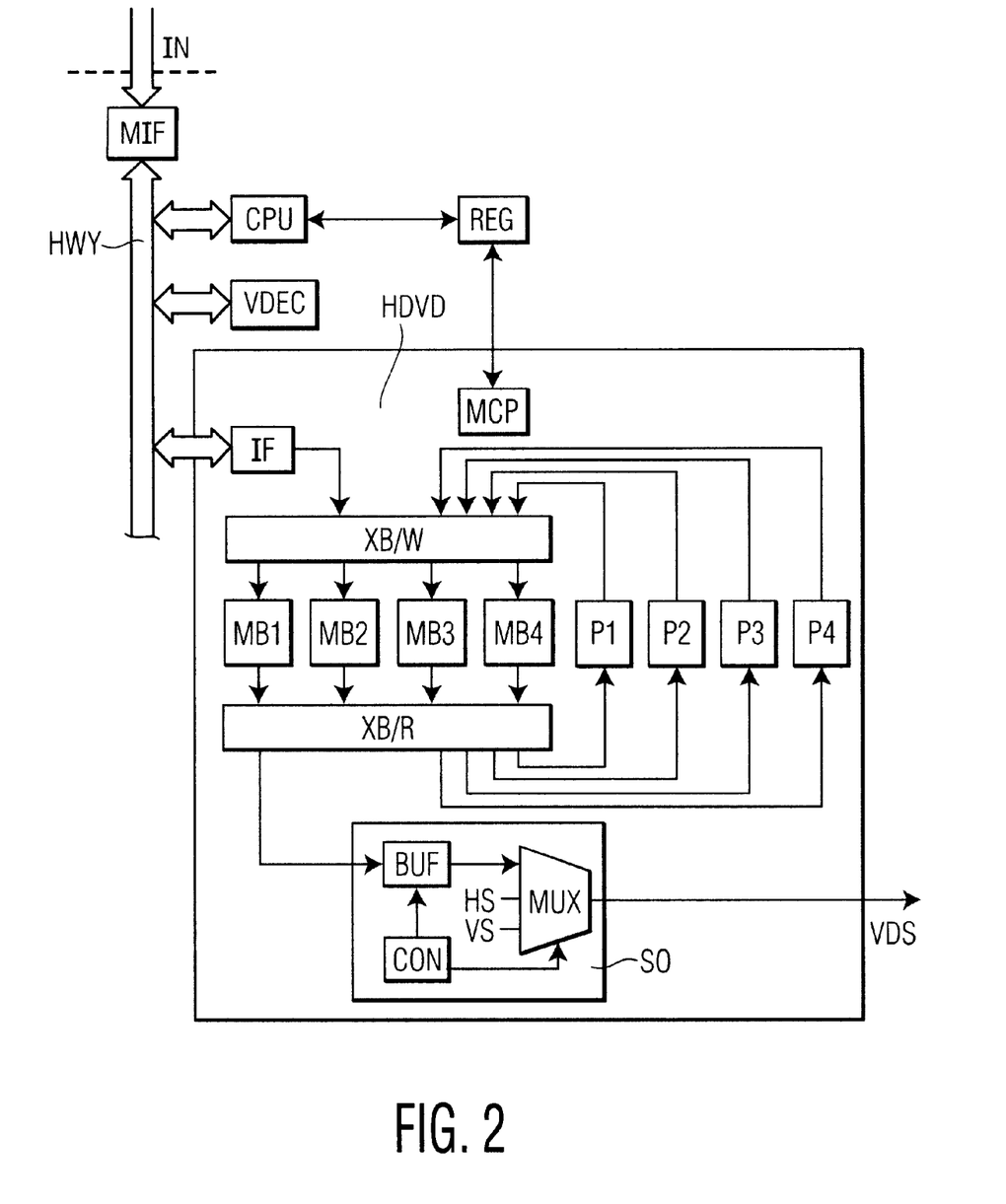
FIG. 2 is a block diagram illustrating an example of a multimedia device in accordance with the invention.
Figure 3:
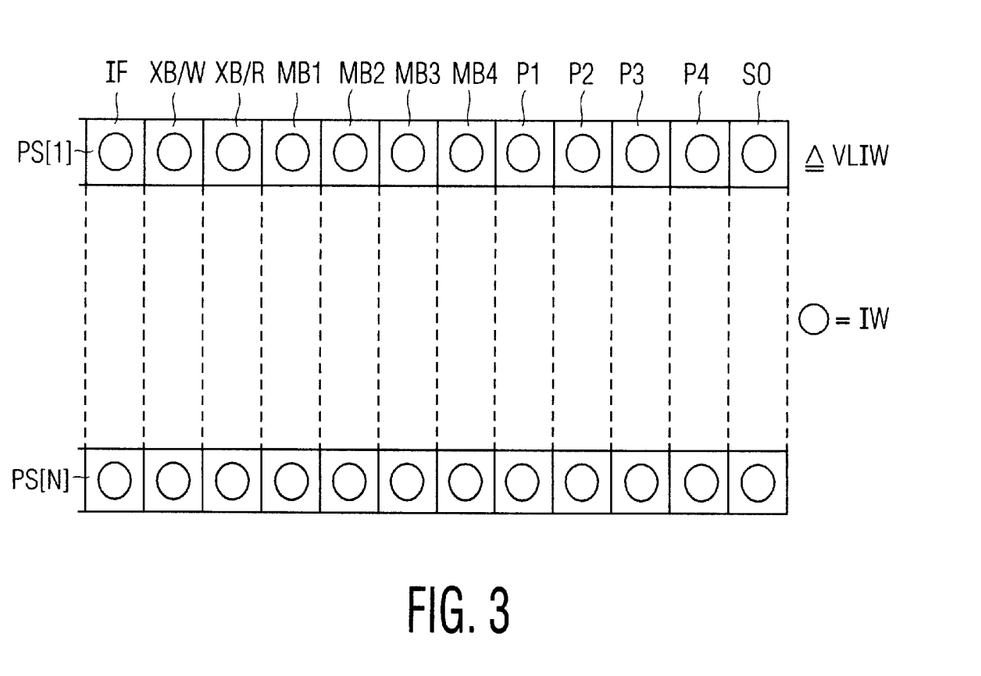
FIG. 3 is a matrix illustrating a programming scheme for a video output unit in the multimedia device illustrated in FIG. 2.

FIG. 2 illustrates an example of a multimedia device which incorporates the features illustrated in FIG. 1 described hereinbefore. The multimedia device processes input data IN comprising coded video data so as to provide, amongst other things, a video data stream VDS adapted for display on a display device. The multimedia device comprises a main interface MIF, a main bus HWY, a central processing unit CPU, a main instruction register REG and various main processors. Two main processors are shown: a video decoder VDEC and a video output unit HDVO. The video output unit HDVO comprises a master control processor MCP and the following data-handling elements: an interface IF, a read crossbar XB/W, a write crossbar XB/R, memory blocks MB, processors P, and a streaming-out circuit SO. The streaming-out circuit SO includes a buffer BUF, a multiplexer MUX and a controller CON. Each data-handling element has a control register. The control registers, which are not shown in FIG. 2, have a structure as illustrated in FIG. 3. That is, a control register comprises a front register and a shadow register.

The multimedia device basically operates as follows. The central processing unit CPU controls the various elements of the multimedia device by means of main instruction words. The main interface MIF fetches the input data IN from, for example, an external main memory. This memory is not shown in FIG. 2. The video decoder VDEC decodes the coded video data contained in the input data IN. Accordingly, decoded video data is obtained which may be temporarily stored in the external main memory. The video output unit HDVO adapts the decoded video data for display on a particular display device. In addition, the video output unit HDVO may combine the decoded video data with other video data so as to provide features such as picture-in-picture or blending.

The operation of the video output unit HDVO will now be explained in greater detail. The video output unit HDVO alternately carries out configuration steps and processing steps. In a configuration step, the master control processor MCP supplies a load command to the control registers of the data-handling elements. It has been mentioned hereinbefore that each control register comprises a front register and a shadow register as illustrated in FIG. 3. Thus, the shadow register loads an instruction word contained in the front register in response to the load command. Accordingly, the instruction word will determine the operation of the data-handling element concerned during the processing step which succeeds the configuration step. For example, the instruction words loaded in the shadow registers of the crossbars XB/W and XB/R determine connections between, on the one hand, the memory blocks MB and, on the other hand, the interface IF, the streaming-out circuit SO and processors P. A control register supplies a configuration-done signal to the master control processor MCP when its shadow register has loaded an instruction word. The master control processor MCP supplies a start-processing signal to the processors P when it has received configuration-done signals from the coritrol registers of all the data-handling elements. The start-processing signal marks the beginning of a processing step.

In a processing step, each processor P processes a specific number of pixels stored in a memory block MB to which the processor P is connected. The number of pixels which a processor P processes in a processing step does not exceed 256. The number of pixels to be processed may be defined, for example, by an instruction word. While the processors P are processing pixels, the master control processor MCP may compose a new VLIW by writing new instruction words into front registers of data-handling elements. Once a processor P has processed its number of pixels, it will stop processing and supply an end-of-operation signal to the master control processor MCP. The processing step ends when all processors P have supplied an end-of-operation signal to the master control processor MCP. In response, the master control processor MCP will carry out a new configuration step.

Accordingly, the video output unit HDVO processes the decoded video data in a block-wise manner. For example, in a first processing step, the interface IF writes a block of 256 pixels into memory block MB1 via the write crossbar XB/W. In a second processing step, processor P1 reads the block of 256 pixels from memory block MB1 and processes it. Processor P1 may be, for example, a horizontal video filter which makes a weighed combination of several pixels belonging to the same line. Accordingly, processor P1 provides a block of horizontally filtered pixels and writes this block into memory block MB2. In a third processing step, processor P2 reads the block of processed horizontally filtered pixels from the memory block MB2 and processes it. Processor P2 may be, for example, a vertical video filter which makes a weighed combination of corresponding pixels belonging to neighboring lines. If the block of horizontally filtered pixels belongs to one line, the processor P2 will read other blocks of horizontally filtered pixels belonging to neighboring lines. Accordingly, processor P2 provides a block of horizontally and vertically filtered pixels and writes this block into memory block MB3. There may be further processing steps in which processor P3 or P4, or both, further process the block of horizontally and vertically filtered pixels contained in memory block MB3. By way of example, it is assumed that the block of horizontally and vertically filtered pixels is ready to form part of the video data stream VDS. Accordingly, in a fourth processing step, the block concerned will be transferred from memory block MB3 to the buffer BUF of the streaming-out circuit SO.

The streaming-out circuit SO generally receives a block of processed pixels with each processing step and stores it in its buffer BUF. The streaming-out circuit SO reads the processed pixels from its buffer BUF for providing the video data stream VDS. The controller CON has knowledge of the desired format of the video data stream VDS, for example in terms of line frequency, field frequency, number of pixels per line, and number of lines per field. The controller CON causes processed pixels to be read from the buffer BUF at the right instants and, thus, at the desired rate. The controller CON further controls the multiplexer MUX which receives the pixels and several control signals such as, for example, horizontal and vertical synchronization signals HS, VS. Accordingly, appropriate control signals are inserted between the pixels at the right instants.

In effect, the video output unit HDVO is a data-processing chain composed of data-handling elements: the interface IF, the read crossbar XB/W, the write crossbar XB/R, the memory blocks MB, the processors P, and the streaming-out circuit SO. The master control processor MCP determines the composition of the data-processing chain. It also determines the data-handling characteristics of each element in the chain. The master control processor MCP does so by writing appropriate instruction words into the control registers of the data-handling elements. In a manner of speaking, the master control processor MCP can be seen as a foreman of a production hall with various machines. The production hall corresponds to the video output unit HDVO and the machines correspond to the data-handling elements in the video output unit HDVO. The foreman composes a production line and instructs the machines therein what to do. The production line corresponds to the data-processing chain.

Let it be assumed that the video output unit HDVO has to convert a single video signal from one format into another format in terms of number of lines per frame and number of pixels per line. This can be achieved by a data-processing chain comprising appropriate horizontal and vertical filtering. At the beginning of the format conversion, the data-processing chain first has to be filled with pixels before it is fully operational. At the end of the format conversion, the data-processing chain has to be emptied before it is stopped or broken down, as it were.

For example, when the first block of pixels of the video signal to be converted is supplied to the video output unit HDVO, only the data-handling elements which are at the beginning of the data-processing chain should be active. At that time, the memory blocks MB are not yet filled with pixels of the frame. With each processing step, more and more memory blocks will be filled with pixels and more and more data-handling elements become active. This continues until each memory block MB in the data-processing chain has been filled with pixels. The data-processing chain is then fully operational and the streaming-out circuit SO can start to provide pixels.

FIG. 3 illustrates a programming scheme for the video output unit HDVO. FIG. 3 is a matrix. The columns of this matrix represent data-handling elements. More specifically, a column represents a shadow register of the data-handling element concerned. The rows of the matrix represent processing steps PS. The cells of the matrix represent instruction words. A VLIW is a composition of cells belonging to a certain row of the matrix, that is, a VLIW is a composition of instruction words for a certain processing step PS. A VLIW defines operations which the data-handling elements concerned should carry out in parallel.

The master control processor MCP may compose a VLIW in various manners. For example, the master control processor MCP may compose a VLIW for a particular processing step by writing an instruction word into each control register. However, the master control processor MCP may also compose a VLIW by writing instruction words into one or more specific control registers, whereas it does not write instruction words into the other control registers. The latter control registers keep the instruction words they contained in the preceding processing step.

The matrix illustrated in FIG. 3 may correspond to the display of, for example, a frame. Processing step PS[1] is the first processing step which is carried out in order to display a frame, and processing step PS[N] is the last processing step. For example, let it be assumed that a frame has 700 lines and 1024 pixels per line. Let it further be assumed that, in a processing step, 256 output pixels are typically supplied to the streaming-out circuit SO. This means that there are typically four processing steps PS per line in the video signal and, consequently, there will be four times 700 processing steps PS per frame, which is 2800 processing steps per frame: N=2800.

The first few processing steps PS constitute an initialization phase for the display of a frame and the last few processing steps PS constitute a closing phase. As explained hereinbefore, the processing chain has to be filled and emptied step-by-step. This implies that, in the initialization phase and in the closing phase, there is at least one data-handling element for which an instruction word in one processing step is replaced by a different instruction word in the subsequent processing step. This further implies that, in the initialization phase and in the closing phase, there will be a different VLIW for each processing step. The processing steps between the initialization phase and the closing phase may also require various different VLIWs. A single VLIW can be used throughout the processing steps between the initialization phase and the closing phase if the same processing chain is used throughout the frame. This may be the case, for example, if the video output unit HDVO only has to convert a single video signal from one format to another format.

Figure 4:
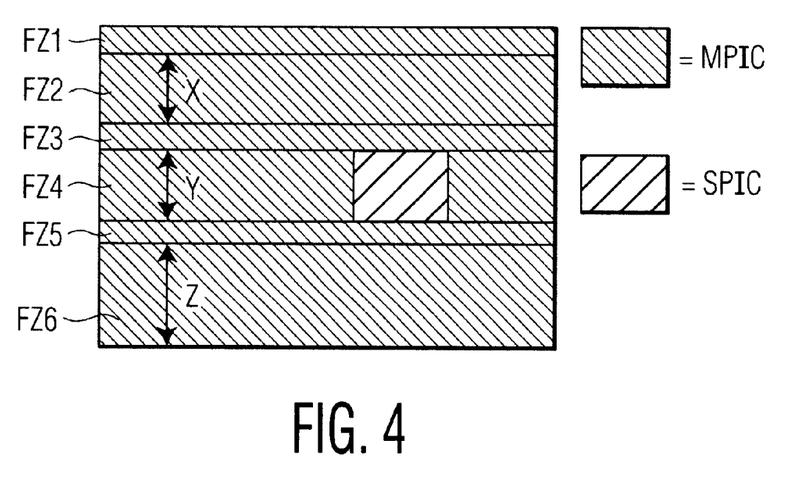
FIG. 4 is a conceptual diagram illustrating a frame which the video output unit has to supply to a display device.

FIG. 4 illustrates a frame which the video output unit HDVO has to supply to a display device. The frame is composed of a main picture MPIC in which a subpicture SPIC is inserted. FIG. 4 further illustrates different frame zones FZ1–FZ6 in the frame. Each frame zone FZ relates to a particular phase in terms of control actions to be carried out by the master control processor MCP shown in FIG. 2.

In frame zone FZ1, the master control processor MCP builds up a processing chain for the display of the main picture MPIC. In frame zone FZ2, the master control processor MCP maintains the latter processing chain. Frame zone FZ2 comprises X lines, X being an integer. In frame zone FZ3, the master control processor MCP breaks down the processing chain for displaying the main picture MPIC and builds up a processing chain for displaying the main picture MPIC and the subpicture SPIC inserted therein. In frame zone FZ4, the master control processor MCP maintains the latter processing chain. Frame zone FZ4 comprises Y lines, Y being an integer. In frame zone FZ5, the master control processor MCP breaks down the processing chain for displaying the main picture MPIC and the subpicture SPIC inserted therein and builds up again the processing chain for displaying the main picture MPIC. In frame zone FZ6, the master control processor MCP maintains the latter processing chain. Frame zone FZ6 comprises Z lines, Z being an integer.

Figure 5:
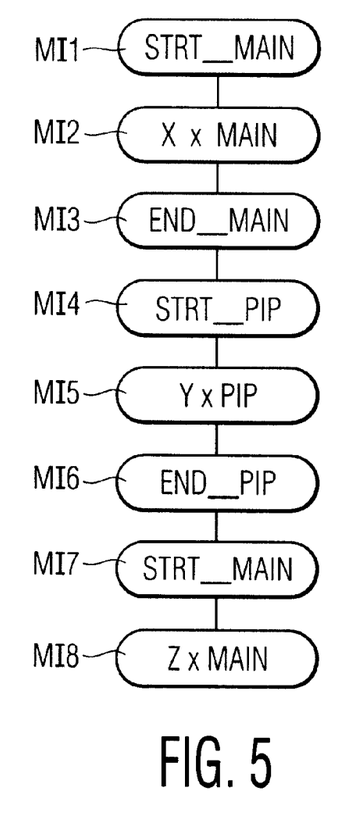
FIG. 5 is a flow chart illustrating a series of main instructions which are supplied to a master control processor in the video output unit.

FIG. 5 illustrates a series of main instructions MI1–MI8 which are supplied to the master control processor MCP in order that it carries out the control actions described hereinbefore. The main instruction MI1 causes the master control processor MCP to execute a subroutine STRT_MAIN which is stored in an internal memory. The main instruction MI1 may be, for example, the start address of the subroutine STRT_MAIN. The execution of the subroutine STRT_MAIN generates a series of VLIWs for the processing steps comprised in frame zone FZ1. For each processing step, a different VLIW is generated and supplied to the data-handling elements of the video output unit HDVO. The series of VLIWs causes the processing chain for displaying the main picture to be built up processing step by processing step.

The main instruction MI2 causes the master control processor MCP to execute a subroutine MAIN X times in succession: X×MAIN. The execution of the subroutine MAIN generates a VLIW which is applied for the processing steps comprised in a line. Accordingly, this VLIW is applied throughout the frame zone FZ2. It causes the data-handling elements to carry out the processing necessary for displaying the main picture MPIC.

The main instruction MI3 causes the master control processor MCP to execute a subroutine END_MAIN. The execution of the subroutine END_MAIN generates a series of VLIWs for processing steps comprised in an upper part of frame zone FZ3. For each processing step, a different VLIW is generated and supplied to the data-handling elements of the video output unit HDVO. The series of VLIWs causes the processing chain for displaying the main picture to be broken down processing step by processing step.

The main instruction MI4 causes the master control processor MCP to execute a subroutine STRT_PIP. The execution of the subroutine STRT_PIP generates a series of VLIWs for the processing steps comprised in a lower part of frame zone FZ3. For each processing step, a different VLIW is generated and supplied to the data-handling elements of the video output unit HDVO. The series of VLIWs causes the processing chain for displaying the main picture MPIC with the subpicture SPIC inserted therein, to be built up processing step by processing step.

The main instruction MI5 causes the master control processor MCP to execute a subroutine PIP Y times in succession: Y×PIP. The execution of the subroutine PIP generates a VLIW which is applied for the processing steps comprised in a line. Accordingly, this VLIW is applied throughout the frame zone FZ4. It causes the data-handling elements to do the processing necessary for displaying the main picture MPIC with the subpicture SPIC inserted therein.

The main instruction M16 causes the master control processor MCP to execute a subroutine END_PIP. The execution of the subroutine END_PIP generates a series of VLIWs for processing steps comprised in an upper part of frame zone FZ5. For each processing step, a different VLIW is generated and supplied to the data-handling elements of the video output unit HDVO. The series of VLIWs causes the processing chain for displaying the main picture MPIC with the subpicture SPIC inserted therein, to be broken down processing step by processing step.

The main instruction MI7 causes the master control processor MCP to execute the subroutine STRT_MAIN again, which subroutine has been described hereinbefore. The main instruction MI8 causes the master control processor MCP to execute the subroutine MAIN Z times in succession: Z×MAIN. The subroutine MAIN has been described hereinbefore.

It has already been mentioned that, in a manner of speaking, the master control processor MCP can be seen as a foreman of a production hall with various machines. The production hall corresponds to the video output unit HDVO and the machines correspond to the data-handling elements in the video output unit HDVO. In this manner of speaking, the main instructions MI can be seen as production orders which the foreman receives from a manager. The foreman translates a production order into instructions for the machines. A collection of instructions to be carried simultaneously, and thus in parallel, corresponds to a VLIW.

The main instructions MI1 can be seen as an order to start up a production line for a product A. The main instruction MI2 can be seen as an order to produce X samples of the product A on this production line. The main instructions MI3 and MI4 can be seen as orders to break down the production line for the product A and to start up a production line for a product B. The main instruction MI5 can be seen as an order to produce Y samples of the product B on this production line, and so on.

Figure 6:
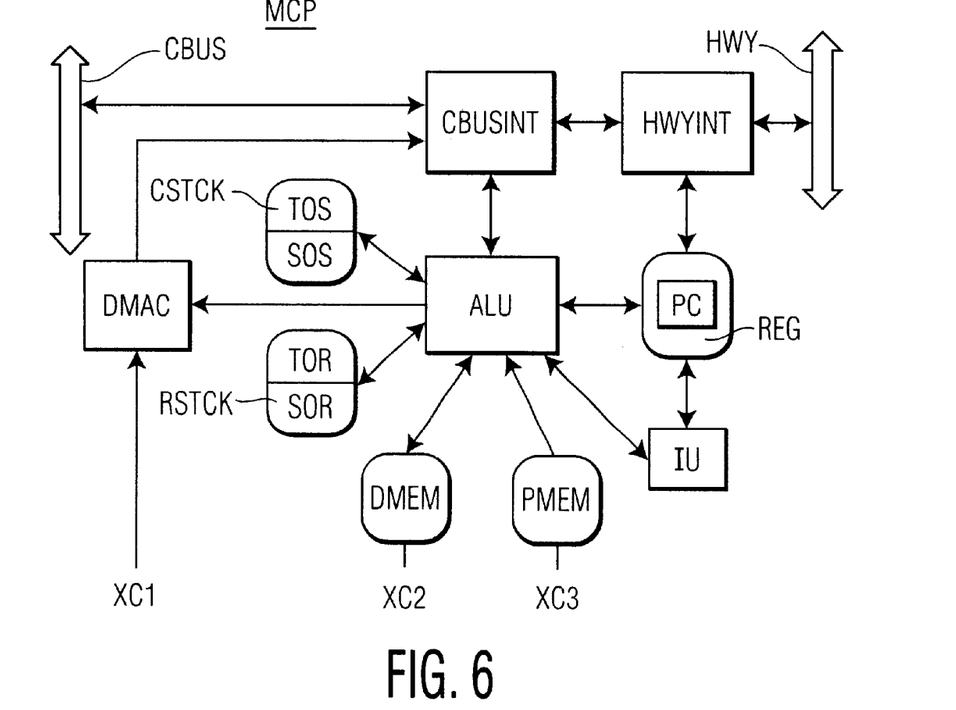
FIG. 6 is a block diagram illustrating an implementation of the master control processor.

FIG. 6 illustrates an implementation of the master control processor MCP shown in FIG. 2. The master control processor MCP communicates with elements outside the video output unit HDVO via the main bus HWY which is also shown in FIG. 2. For example, the master control processor MCP may receive a main instruction via the main bus HWY. The master control processor MCP communicates with the data-handling elements in the video output unit HDVO via a control bus CBUS. For example, the master control processor may send instruction words to the data-handling elements via the control bus CBUS. The master control processor MCP can further receive data from and send data to memory blocks MB in the video output unit HDVO via connections XC.

The master control processor MCP comprises a main-bus interface HWYINT, a control-bus interface CBUSINT, an arithmetic logic unit ALU, an assembly of registers REG including a program counter PC, an assembly of interrupt units IU, a compute stack CSTCK, a return stack RSTCK, a program memory PMEM, a data memory DMEM and a direct memory-access circuit DMAC. The compute stack CSTCK and the return stack RSTCK each have a stack pointer. The stack pointer defines the position of respective storage elements in the stack concerned. The top-of-stack position and the second-of-stack position in the compute stack CSTCK will hereinafter be referred to as TOS and SOS, respectively. The top-of-stack position and the second-of-stack position of the return stack RSTCK will hereinafter be referred to as TOR and SOR, respectively.

The master control processor MCP basically operates as follows. The program counter PC contains a program-count value which is typically incremented with each clock cycle. The program-count value may be changed by writing a new program-count value into the program counter PC. The program-count value constitutes an address for the program memory PMEM in which instructions for the master control processor MCP are stored. These instructions will be referred to as MCP instructions hereinafter. An MCP instruction defines an operation which the arithmetic logic unit ALU carries out. It may further define operations for controlling the return stack RSTCK and the compute stack CSTCK as will be explained in greater detail hereinafter. A subroutine for generating VLIWs as described hereinbefore, is formed by a set of MCP instructions.

A set of instructions can be stored in the program memory PMEM in the following manner. The set of instructions is first loaded from a source outside the multimedia device into the memory blocks MB via the main bus HWY. Then, the set of instructions, or a portion thereof, is copied from the memory blocks MB to the program memory PMEM via the connections XC. The program memory PMEM may contain several banks. In that case, it is possible to copy instructions from the memory blocks MB to a bank while the master control processor MCP executes instructions contained in another bank.

An instruction can be stored in the memory blocks MB in the following manner. A first memory block MB1 contains a most-significant portion of the instruction, a second memory block MB2 an intermediate significant portion, and a third memory block MB3 a least significant portion, each portion comprising, for example, 8 bits. When these portion are transferred to the program memory PMEM they are, as it were, glued together to form an instruction comprising 24 bits. It should be noted that the memory blocks MB in which the instructions are stored may be additional to the memory blocks MB in which data to An MCP instruction is a type-2 instruction if bit b22 has the value zero (0) and bit b21 has the value one (1). Type-2 instructions serve to transfer data. A type-2 instruction includes a transfer-control portion which is formed by bits b20–b17. The transfer-control portion defines source and destination of data to be transferred. More specifically, bits b18–b17 define the source and bits b20–b19 define the address of the destination of the data. There are four sources of data: TOS, SOS, TOR or the program counter PC. There are four addresses of the destination: the content of TOS, the content of SOS, bits b11–b0 of the MCP instruction itself with or without an index value added thereto.

Type-0, type-1 and type-1A instructions primarily serve to generate instruction words for the data-handling elements in the video output unit HDVO shown in FIG. 2. Type-2 data instructions primarily serve to transfer the instruction words thus generated to control registers of the data-handling elements. The latter MCP instructions are, as it were, export MCP instructions.

MCP instructions of the type 1, 1A and 2 include a stack-control portion formed by bits b16–b13. The compute stack CSTCK is controlled in dependence on bits b16–b15 and the return stack RSTCK is controlled in dependence on bits b14–b13. There are four control actions for the compute stack CSTCK and four control actions for the return stack RSTCK. The values of bits b16–b15 and bits b14–b13 determine which of the four respective control actions is carried out.

Figure 7:
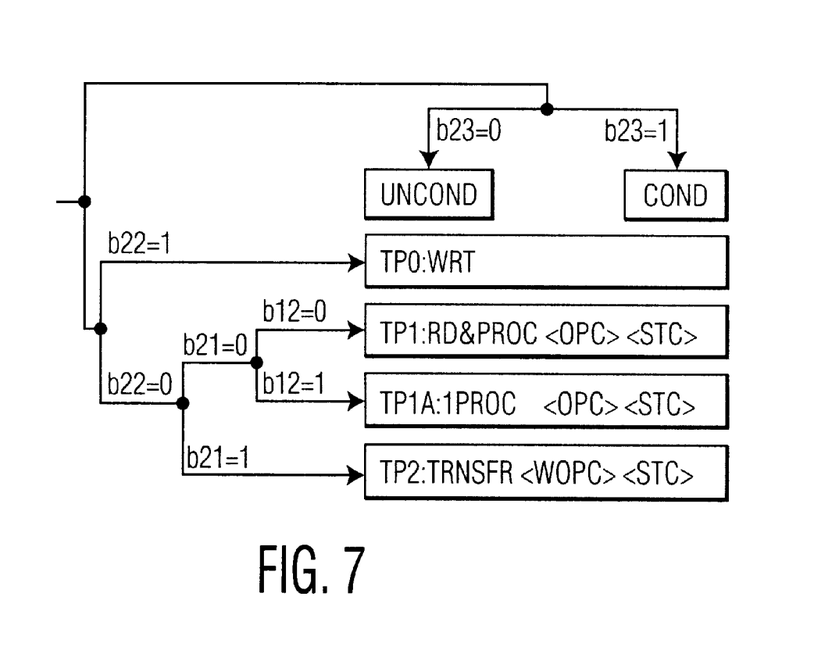
FIG. 7 is a chart illustrating a relation between various types of instructions for the master control processor and bits contained in these instructions.

FIG. 7 illustrates the relation between the various types of MCP instructions described hereinbefore and bits b23–b21 and b12 contained in these instructions. In FIG. 7, reference letters are used to designate the various types of MCP instructions: UNCOND designates an unconditional instruction, COND a conditional instruction and TP0, TP1, TP1A and TP2 designate a type-0, type-1, type-1A, and type-2 instruction, respectively. FIG. 7 further includes reference letters which indicate the nature of the latter four MCP instructions. A type-0 instruction serves to write data: WRT. A type-1 instruction serves to read data from an internal memory and process this data RD&PROC. A type-1A instruction serves to process data contained in the instruction, that is, it serves to immediately process data IPROC. A type-2 instruction serves to transfer data TRNSFR. FIG. 7 further includes letter references which indicate an opcode portion: OPC, a transfer-control portion: WOPC, and a stack-control portion: STC.

As mentioned hereinbefore, bits b16,b15 define four control actions for the compute stack CSTCK. There is a Nop, Cpy, Psh and Pop control action. The Nop control action does not change the compute stack RSTCK. The Cpy control action copies the content be processed is stored. That is, the multimedia device may comprises several sets of memory blocks, for example, one for data and another for control, each set of memory blocks having its own crossbars.

The following is an example of a syntax for the MCP instructions. An MCP instruction comprises 24 bits: b23–b0. Bit b23 defines whether an MCP instruction is unconditional or conditional. An MCP instruction is unconditional if bit b23 of the MCP instruction has the value 0 (zero). An unconditional MCP instruction is always executed. An MCP instruction is conditional if bit b23 of the MCP instruction has the value 1 (one). A conditional MCP instruction will be executed only if the least significant bit in a certain register has the value 0 (zero). Bits b22, b21 and b12 are used to distinguish between different types of MCP instructions. Any type of MCP instruction may be unconditional or conditional. An MCP instruction is a type-0 instruction if bit b22 of the MCP instruction has the value 1 (one). Type-0 instructions serve to write data into an internal memory location which may be, for example, a register . Bits b21–b12 of a type-0 instruction constitute the data to be written. Bits b11–b0 define an address of a memory location in which the data is to be written. If the memory location has a size which is larger than ten bits, the data is sign-extended.

An MCP instruction is either a type-1 or type-1A instruction if bits b22 and b21 are both zero (0). Type-1 and type-1A instructions serve to process data. An MCP instruction is a type-1 instruction if, in addition, bit b12 has the value zero (0). Bits b11–b0 of a type-1 instruction define an address. The data stored under this address forms input data for the arithmetic logic unit ALU. An MCP instruction is a type-1A instruction if bit b12 has the value one (1). Bits b11–b0 of a type-1A instruction represent data. This data forms input data for the arithmetic logic unit ALU. The data may be sign, extended to form a 16-bit binary word before it is supplied to the arithmetic logic unit ALU.

A type-1 or 1A instruction includes an opcode portion which is formed by bits b20–b17. The opcode portion determines an operation in terms of which processing operation the arithmetic logic unit ALU carries out on the input data and where the result of this processing operation is stored. The result is either written into TOS or into the program counter PC. There are 16 different operations for type-1 instructions and also 16 different operations for type-1A instructions. For example, an operation is making an AND combination of the input data and the content of TOS and writing the result of this AND combination into TOS. Other operations can make NOR, XOR, NAND, OR, XNOR combinations. of TOS to SOS. This copying is done before the arithmetic logic unit ALU carries out the instruction. The Psh control action increments the stack pointer. As a result, the storage element which is TOS prior to the instruction, becomes SOS after the instruction. The content of the storage element which is TOS prior to the instruction is by default copied to the storage element which is TOS after the instruction. Thus, the content TOS before the instruction is the content of TOS after the instruction. However, if the instruction causes the arithmetic logic unit ALU to write data into TOS, the content of TOS after the instruction will be that data. The Pop control action decrements the stack pointer. As a result, the storage element which is SOS prior to the instruction, becomes TOS after the instruction.

As mentioned hereinbefore, bits b14,b13 define four control actions for the return stack RSTCK. There is a Rnop, Rpc, Rpsh and Rpop control action. The Rnop action does not change the return stack RSTCK. The control action Rpc increments the stack pointer. A constant value is added to the program-count value and the result of this addition is copied to TOR. The constant value is implementation-dependent. The Rpsh action increments the stack pointer. As a result, the storage element which is TOR prior to the instruction, becomes SOR after the instruction. The data contained in the storage element which is TOS prior to the instruction, is by default pushed on the return stack RSTCK. That is, the content of TOR after the instruction is the content of TOS prior the instruction. However, if the instruction causes the arithmetic logic unit ALU to write data into TOR, the content of TOR after the instruction will be that data. The Rpop control action decrements the stack pointer. As a result, the storage element in the stack which is SOR prior to the instruction, becomes TOR after the instruction. That is, the content of TOR after the instruction is the content of SOR before the instruction.

In principle, any stack-related control action described hereinbefore is carried out independently of an operation defined in the opcode portion of type-1 and 1A instructions. Any stack-related control action is also carried out independently of a data transfer defined in the transfer-control portion of type-2 instructions. Thus, numerous combinations are possible.

The compute stack CSTCK and the return stack RSTCK are both controlled according to the following rules. The stack pointer is incremented before the arithmetic logic unit ALU carries out the instruction concerned, whereas the stack pointer is decremented thereafter. Thus, a push-type instruction immediately followed by a pop-type instruction will leave the stack pointer unchanged. If the stack control involves copying data from one stack position to another, the data which is copied is always the data contained in the stack position before the instruction.

When the master control processor MCP executes an instruction, it may happen that the arithmetic logic unit ALU wants to write into a stack position whereas the stack-control portion of the instruction wants to write into the same stack position. In that case, there is a conflict. The conflict is resolved in that the arithmetic logic unit ALU has priority. The output data of the arithmetic logic unit ALU is written into the stack position concerned. In any case, the stack pointer is modified in accordance with the stack-control portion of the instruction even in the case of a conflict.

There are various manners in which it can be achieved that the compute stack CSTCK and return stack RSTCK behave as described hereinbefore in response to bits b16,b15 and bits b14,b13, respectively, of an MCP instruction. For example, each stack may be formed by storage elements arranged as a first in, last out (FILO) memory. Such a memory typically shifts the data it contains by one position in response to a positive or a negative edge of a clock. The direction in which the data is shifted is typically defined by control data applied to a control input of the FILO memory. Relatively simple logic circuitry will generally be sufficient to derive appropriate control data from the bits concerned in the instruction.

Figure 8:
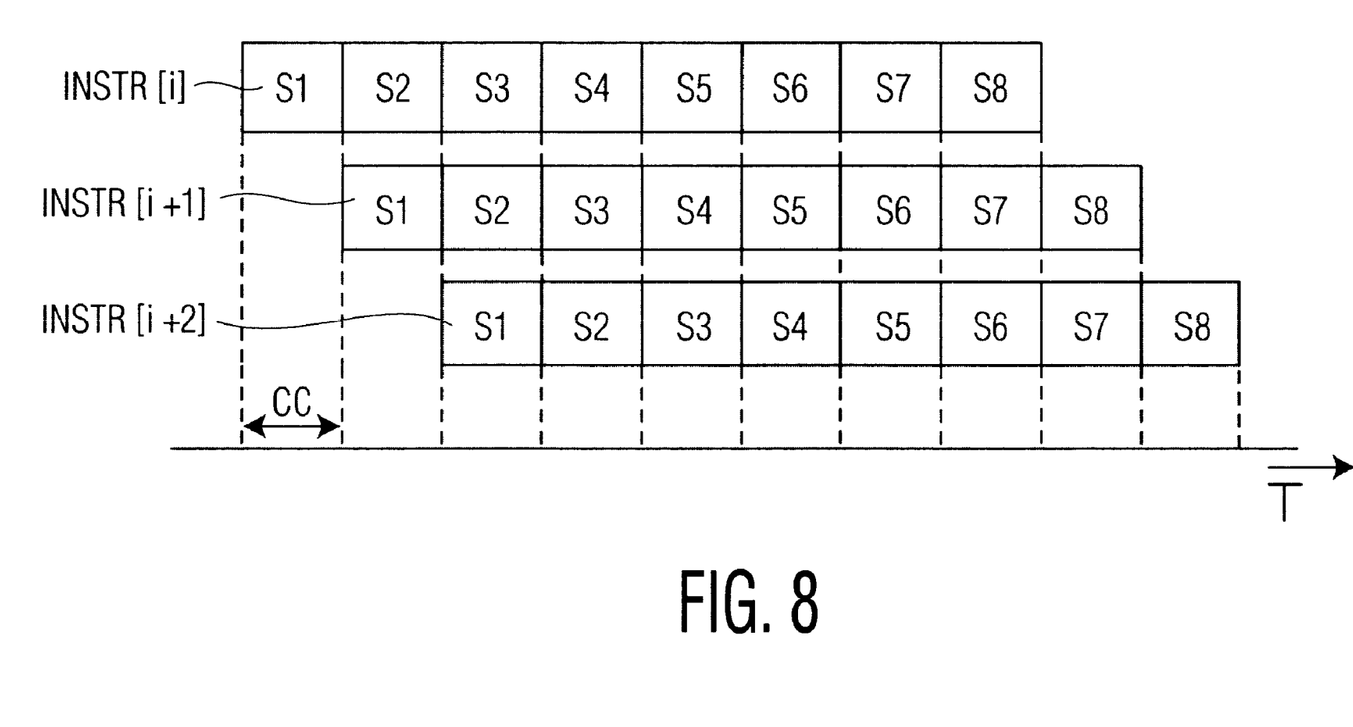
FIG. 8 is a diagram illustrating the manner in which the master control processor executes instructions.

FIG. 8 illustrates the manner in which the master control processor MCP executes instructions. FIG. 8 is a diagram in which the horizontal dimension represents time and the vertical dimension instructions INSTR. An instruction INSTR is executed in 8 different steps S1–S8. Each step corresponds to a clock cycle CC. Consequently, it takes 8 clock cycles to fully execute an instruction. The master control processor MCP begins to carry out a new instruction each clock cycle. Thus, at a given clock cycle, the master control processor MCP carries out different steps in parallel, each step belonging to a different instruction.

In step S1, the master control processor MCP fetches an instruction. It is in this step that the program counter is read. In step S2, the instruction is decoded. In step S3, input data for the arithmetic logic unit ALU is read from an internal storage element. Step S4 is an internal data delay. In step S5, an arithmetic or logic operation is carried out as defined in the instruction. In step S6, the result of the arithmetic or logic operation is written into an internal storage element. It is in this step that the TOS is effectively written back. Furthermore, the program counter is updated. Step S7 is a delay. In step S8, any data can effectively be applied to the control bus CBUS which couples the master control processor MCP to various data processors comprised in the multimedia device.

The master control processor MCP comprises the necessary pipeline stages and bypasses for stack writes so as to allow stack instructions to be executed one after the other without adding extra wait cycles. For example, the master control processor MCP comprises a data-transfer path between the output and an input of the arithmetic logic unit ALU so that a result of an arithmetic or logic operation can be used as TOS data for a subsequent arithmetic or logic operation. A similar data path is used for the return stack.

An MCP instruction may cause the direct memory-access circuit DMAC, shown in FIG. 6, to carry out a direct memory-access session. In a direct memory-access session, the direct memory-access circuit DMAC autonomously transfers a block of instruction words contained in a memory to control registers of various data-handling elements in the video output unit HDVO shown in FIG. 4. The MCP instruction defines a start address and a mode for the direct memory-access session. There are three different direct memory-access modes.

In a first direct memory-access mode, the direct memory-access circuit DMAC writes instruction words into a range of control registers having successive addresses. The first instruction, word of the block is written into a control register whose address is the start address, the second instruction word is written into a control register whose address is the start address plus one, and so on.

In a second direct memory-access mode, the direct memory-access circuit DMAC first reads a template. The template is a binary word in which each bit corresponds to a different control register in a range of control registers having successive addresses. The range begins at the start address. In effect, the direct memory-access circuit DMAC reads the template bit by bit and writes the first instruction word of the block into the control register corresponding to the first-read bit whose value is one (1), the second instruction word into the control register corresponding to the second-read bit whose value is one (1), and so on.

In a third direct memory-access mode, the direct memory-access circuit DMAC first reads an offset value before it writes an instruction word into a control register. The instruction word is written into the control register whose address is the address of the control register previously written into, plus the offset value. The first instruction word of a block is written into a control register whose address is the start address plus the first-read offset value.

The master control processor MCP preferably uses the direct memory-access circuit DMAC to compose a VLIW which differs significantly from a preceding VLIW, or if there is no preceding VLIW. For example, a direct memory-access session can be used to initialize the video output unit HDVO. A direct memory-access session prevents the master control processor MCP itself from having to write relatively many instruction words into the control registers. The master control processor MCP delegates, as it were, this task to the direct memory-access circuit DMAC. The direct memory-access circuit DMAC will then make use of the control bus CBUS for writing instruction words into the control registers. Thus, during a direct memory-access session, the other elements in the master control processor MCP cannot access the control bus CBUS.

The master control processor MCP does not need to use the direct memory-access circuit DMAC to compose a VLIW which resembles a preceding VLIW. Such a look-alike VLIW can be composed by modifying the content of relatively few control registers. The master control processor MCP may then directly write new instruction words into the appropriate control registers.

Thus, from a programming point of view, there are two techniques for composing VLIWs. A first technique is to use one or more MCP instructions causing the master control processor MCP to write new instruction words into specific control registers. This technique is preferably applied for composing a look-alike VLIW. A second technique is to use an MCP instruction causing the master control processor MCP to initiate a direct memory-access session. This technique is preferably used for composing a VLIW which differs significantly from a preceding VLIW, or for initializing the video output unit HDVO.

The drawings and their description hereinbefore illustrate rather than limit the invention. It will be evident that there are numerous alternatives which fall within the scope of the appended claims. In this respect, the following closing remarks are made.

The instruction-word composing software IWCS illustrated in FIG. 1 may be contained, for example, in a memory. It may have been written into the memory in a factory. However, it is also possible that a user copies the instruction-word composing software IWSC from an information carrier to the memory. Accordingly, the user can cause the data-processing. arrangement DPA illustrated in FIG. 1, to carry out a certain function .The information carrier which contains the instruction-word composing software IWSC may be, for example, a disk. The instruction-word composing software can also be made available via a communication network such as, for example, the Internet.

There are numerous ways of physically spreading functions or functional elements over various units. In this respect, the drawings are very diagrammatic, each representing only one possible embodiment of the invention. Thus, although a drawing shows different functional elements as different blocks, this by no means excludes the implementation of some functional elements or all functional elements as a single physical unit.

Any reference sign in a claim should not be construed as limiting the claim.

What is claimed is:

1. A processor comprising an arithmetic logic unit that co-operates with a stack arrangement, wherein the processor is arranged to execute fixed length instructions comprised of variable length fields, including a stack control field and an opcode control field for controlling the stack arrangement and the arithmetic logic unit, respectively, so that a number of place-holding bits in the fixed length instructions are reduced.

2. A processor as claimed in claim 1, wherein that the stack arrangement comprises a compute stack and a return stack and in that the stack control field comprises a compute stack sub-field for controlling the compute stack and a return stack sub-field for controlling the return stack.

3. A multimedia device comprising a plurality of data processors and a control processor for providing control data to the plurality of data processors on the basis of fixed length instructions comprised of variable length fields, including a stack control field and an opcode field for controlling a stack arrangement and an arithmetic logic unit, respectively, comprised in the control processor, so that a number of place-holding bits in the fixed length instructions are reduced.

4. A computer program product for a processor which comprises an arithmetic logic unit that co-operates with a stack arrangement, the computer program product comprising fixed length instructions comprised of variable length fields, including a stack control field and an opcode field which control the stack arrangement and the arithmetic logic unit, respectively, so that a number of place-holding bits in the fixed length instructions are reduced, when the instructions are executed by the processor.

* * * * *